United States Patent
Zhang et al.

(10) Patent No.: US 8,472,965 B2
(45) Date of Patent: Jun. 25, 2013

(54) MOBILITY IN MULTI-CARRIER HIGH SPEED PACKET ACCESS

(75) Inventors: Danlu Zhang, San Diego, CA (US);
Rohit Kapoor, San Diego, CA (US);
Aziz Gholmieh, San Diego, CA (US);
Sharad D. Sambhwani, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 492 days.

(21) Appl. No.: 12/725,211

(22) Filed: Mar. 16, 2010

(65) Prior Publication Data

US 2010/0238904 A1 Sep. 23, 2010

Related U.S. Application Data

(60) Provisional application No. 61/160,873, filed on Mar. 17, 2009.

(51) Int. Cl.
*H04W 72/00* (2009.01)

(52) U.S. Cl.
USPC .......................................................... 455/451

(58) Field of Classification Search
USPC .......................................................... 455/451
See application file for complete search history.

(56) References Cited

U.S. PATENT DOCUMENTS

| | | | |
|---|---|---|---|
| 6,754,191 B1 | 6/2004 | Paranchych et al. |
| 7,813,740 B2 | 10/2010 | Wei et al. |
| 8,169,953 B2 | 5/2012 | Damnjanovic et al. |
| 2005/0260990 A1* | 11/2005 | Huang et al. | 455/436 |
| 2007/0076641 A1 | 4/2007 | Bachl et al. |
| 2008/0075109 A1 | 3/2008 | Zangi |

FOREIGN PATENT DOCUMENTS

| | | |
|---|---|---|
| CA | 2351164 A1 | 12/2001 |
| JP | 2002176412 A | 6/2002 |
| JP | 2009510915 A | 3/2009 |
| WO | 2007041011 A1 | 4/2007 |

OTHER PUBLICATIONS

International Search Report and Written Opinion—PCT/US2010/027696, International Search Authority—European Patent Office—Aug. 5, 2010.
3GPP: "3rd Generation Partnership Project; Technical Specification Group Radio Access Network; Radio Resource Control (RRC); Protocol Specification (Release 8)", 3GPP TS25.331 V8.5.0 (Dec. 2008) Section 8.3.1, pp. 189-229.
Qualcomm Europe: "DC-HSUPA impact on RAN2 specifications," 3GPP Draft; R2092156 DC-HSUPA Impact on RAN2 Specifications, 3rd Generation Partnership Project (3GPP), Mobile Competence Centre; 650, Route Des Lucioles; F-06921 Sophia-Antipolis Cedex; France, No. Seoul, Korea; 20090317, Mar. 17, 2009, XP050339993.

* cited by examiner

*Primary Examiner* — Nathan Mitchell
(74) *Attorney, Agent, or Firm* — D. Scott Juneau

(57) ABSTRACT

A method for wireless communications is provided. The method includes generating two or more uplink carrier signals across a wireless network and generating at least one active signal set for the wireless network. The method also includes generating one or more secondary active signal sets in accordance with the two or more uplink carrier signals to facilitate communications across the wireless network.

50 Claims, 11 Drawing Sheets

US 8,472,965 B2

MOBILITY IN MULTI-CARRIER HIGH SPEED PACKET ACCESS

CLAIM OF PRIORITY UNDER 35 U.S.C. §119

This application claims the benefit of U.S. Provisional Patent Application No. 61/160,873, entitled MOBILITY IN MULTI-CARRIER HIGH SPEED PACKET ACCESS, and filed on Mar. 17, 2009, the entirety of which is incorporated herein by reference.

BACKGROUND

I. Field

The following description relates generally to wireless communications systems, and more particularly more particularly to multi-carrier high speed packet access (HPSA).

II. Background

Wireless communication systems are widely deployed to provide various types of communication content such as voice, data, and so forth. These systems may be multiple-access systems capable of supporting communication with multiple users by sharing the available system resources (e.g., bandwidth and transmit power). Examples of such multiple-access systems include code division multiple access (CDMA) systems, time division multiple access (TDMA) systems, frequency division multiple access (FDMA) systems, 3GPP Long Term Evolution (LTE) systems including E-UTRA, and orthogonal frequency division multiple access (OFDMA) systems.

An orthogonal frequency division multiplex (OFDM) communication system effectively partitions the overall system bandwidth into multiple ($N_F$) subcarriers, which may also be referred to as frequency sub-channels, tones, or frequency bins. For an OFDM system, the data to be transmitted (i.e., the information bits) is first encoded with a particular coding scheme to generate coded bits, and the coded bits are further grouped into multi-bit symbols that are then mapped to modulation symbols. Each modulation symbol corresponds to a point in a signal constellation defined by a particular modulation scheme (e.g., M-PSK or M-QAM) used for data transmission. At each time interval that may be dependent on the bandwidth of each frequency subcarrier, a modulation symbol may be transmitted on each of the $N_F$ frequency subcarrier. Thus, OFDM may be used to combat inter-symbol interference (ISI) caused by frequency selective fading, which is characterized by different amounts of attenuation across the system bandwidth.

Generally, a wireless multiple-access communication system can concurrently support communication for multiple wireless terminals that communicate with one or more base stations via transmissions on forward and reverse links. The forward link (or downlink) refers to the communication link from the base stations to the terminals, and the reverse link (or uplink) refers to the communication link from the terminals to the base stations. This communication link may be established via a single-in-single-out, multiple-in-signal-out or a multiple-in-multiple-out (MIMO) system.

One issue with wireless systems relates to multicarrier functionality for high-speed uplink packet access (HSUPA). In general, HSUPA employs a packet scheduler, but operates on a request-grant communication where user equipment or devices can request permission to send data, where a scheduler decides when and how many devices will be allowed to do so. A request for transmission contains data about the state of the transmission buffer and queue at the device. In addition to this scheduled mode of transmission, applicable standards also allow a self-initiated transmission mode from the devices, denoted non-scheduled. With addition of a second uplink carrier however, various problems arise regarding the active set definition which was tailored to single carrier performance. Other mobility management issues are also encountered when attempting to support multi-carrier operations.

SUMMARY

The following presents a simplified summary in order to provide a basic understanding of some aspects of the claimed subject matter. This summary is not an extensive overview, and is not intended to identify key/critical elements or to delineate the scope of the claimed subject matter. Its sole purpose is to present some concepts in a simplified form as a prelude to the more detailed description that is presented later.

Systems and methods are provided to facilitate wireless communications in multicarrier high speed uplink applications. In one aspect, additional sets referred to as 'secondary active set' and 'secondary E-DCH active set' are provided, where E-DCH refers to enhanced dedicated channel. The secondary E-DCH active set can be a subset of the secondary active set. Furthermore, the secondary active set and secondary E-DCH active set can be subsets of the active set and E-DCH active set, respectively. Various mobility events (e.g., Event 2a) can be anchor-based and can be employed as an efficient mode to change the anchor carrier. This includes intra-frequency mobility events, e.g., Event 1x(1a, 1b, and so forth) that can also be independent per carrier; where the inter-frequency mobility events, e.g., Event 2x(2a, 2b, and so forth) that are anchor-based. The systems and methods provide a protocol extension by defining a secondary active set together with efficient mobility schemes. These systems and methods can also be extended to more than two carriers on the uplink as well. For instance, tertiary sets or higher can be applied and/or extended depending on the number of number of uplink carriers supported. Since events can be triggered on both carriers, to reduce the delay in the mobility events, the user equipment can perform searches on the secondary carrier. Furthermore, when the secondary carrier is de-activated, the user equipment monitors the channel conditions on the secondary carrier for mobility events. There is an optional capability of searching the secondary frequency in non-compressed mode.

To the accomplishment of the foregoing and related ends, certain illustrative aspects are described herein in connection with the following description and the annexed drawings. These aspects are indicative, however, of but a few of the various ways in which the principles of the claimed subject matter may be employed and the claimed subject matter is intended to include all such aspects and their equivalents. Other advantages and novel features may become apparent from the following detailed description when considered in conjunction with the drawings.

DETAILED DESCRIPTION

Systems and methods are provided to generate and process multiple carriers in an uplink packet access wireless network. In one aspect, a method for wireless communications is provided. The method includes generating two or more uplink carrier signals across a wireless network and generating at least one active signal set for the wireless network. The method also includes generating one or more secondary active signal sets in accordance with the two or more uplink carrier signals to facilitate communications across the wireless network.

It is noted that in one or more exemplary embodiments described herein, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

Figure 1:
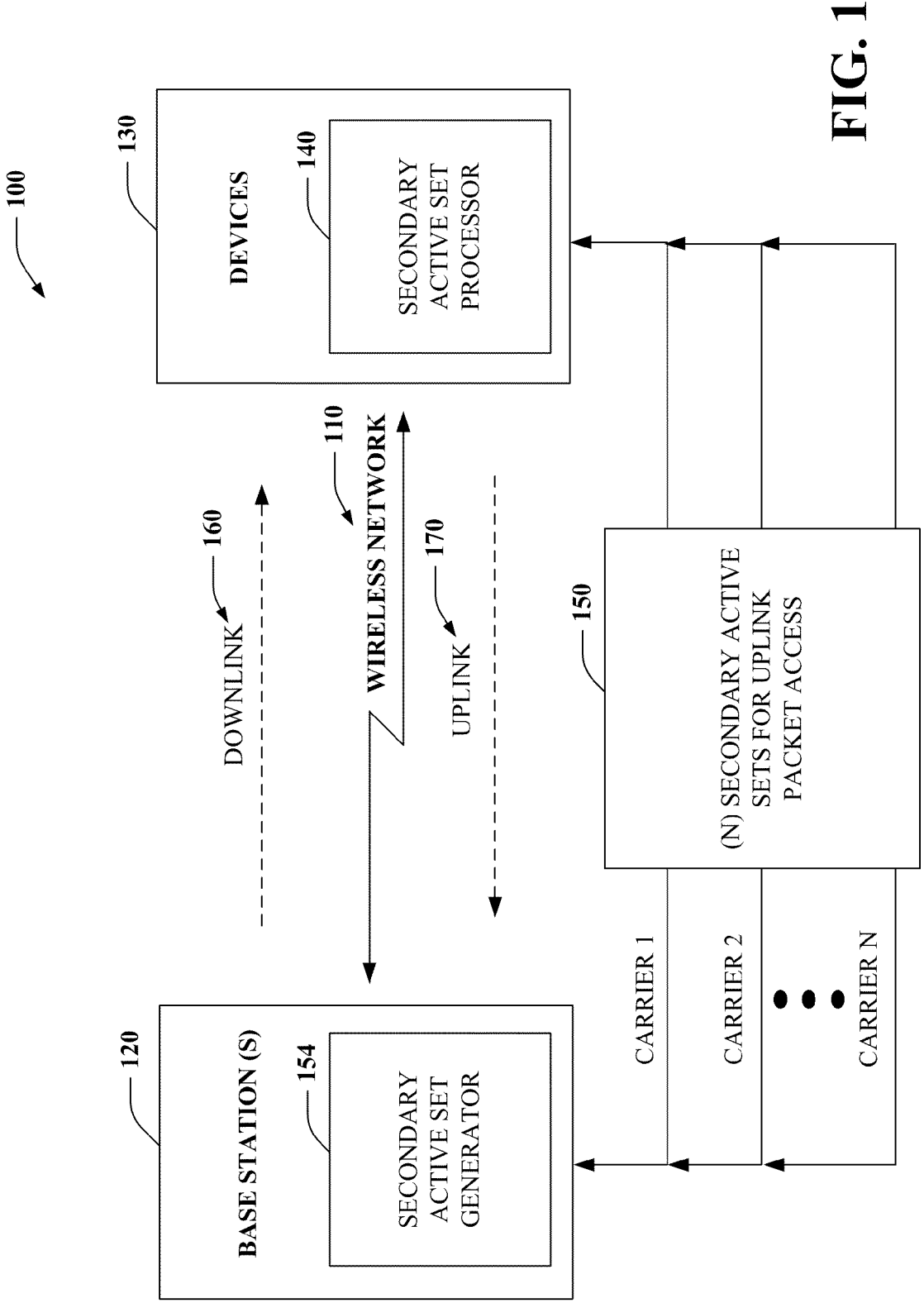
FIG. 1 is a high level block diagram of a system that provides uplink multicarrier operations for a wireless communications system.

Referring now to FIG. 1, a system 100 provides uplink multicarrier operations for a wireless communications network 110. The system 100 includes one or more base stations 120 (also referred to as a node, evolved node B-eNB, serving eNB, target eNB, femto station, pico station) which can be an entity capable of communication over the wireless network 110 to various devices 130. For instance, each device 130 can be an access terminal (also referred to as terminal, user equipment, mobility management entity (MME) or mobile device). The device 130 can include a secondary active set processor 140 that is provided to receive and process multiple wireless carriers on an uplink communication. The secondary active set processor 140 responds to (N) secondary active sets 150 emanating from a secondary active set generator 154 at the base station 120. It is noted that a plurality of secondary active sets 150 can be generated at the base station 120 and processed at the device 130, where N is an integer that generally corresponds to at least one secondary active set that is generated per each active set on an uplink channel for the wireless network 110.

As shown, the base station 120 communicates to the device 130 (or devices) via downlink 160 and receives data via uplink 170. Such designation as uplink and downlink is arbitrary as the device 130 can also transmit data via downlink and receive data via uplink channels. It is noted that although two components 120 and 130 are shown, that more than two components can be employed on the network 110, where such additional components can also be adapted for the multicarrier operations described herein. It is further noted that although the processor 140 and generator 154 typically apply to a high speed uplink packet access (HSUPA) systems that such communications can also apply to high speed downlink packet access (HSDPA) or other wireless protocols as well.

In general, the system 100 facilitates wireless communications in multicarrier high speed uplink applications. In one aspect, additional sets 150 referred to as 'secondary active set' and 'secondary E-DCH active set' are provided, where E-DCH refers to enhanced dedicated channel. The secondary E-DCH active set can be a subset of the secondary active set. Furthermore, the secondary active set and secondary E-DCH active set can be subsets of the active set and E-DCH active set, respectively. Various mobility events (e.g., Event 2a) can be anchor-based and can be employed as an efficient mode to change the anchor carrier as will be described in more detail below. This includes intra-frequency mobility events, e.g., Event 1x(1a, 1b, and so forth) that can also be independent per carrier; where the inter-frequency mobility events, e.g., Event 2x(2a, 2b, and so forth) that are anchor-based. The systems and methods provide a protocol extension by defining the secondary active set 150 together with efficient mobility schemes. These systems and methods can also be extended to more than two carriers on the uplink as well. For instance, tertiary sets or higher can be applied and/or extended at 150 depending on the number of number of uplink carriers supported.

In general, HSUPA employs an uplink enhanced dedicated channel (E-DCH) on which it can employ link adaptation methods similar to those employed by HSDPA, namely: Shorter Transmission Time Interval enabling faster link adaptation; and HARQ (hybrid ARQ) with incremental redundancy causing retransmissions to be more effective. Similarly to HSDPA, HSUPA uses a packet scheduler, but operates on a request-grant principle where the UEs 130 request a permission to send data and the scheduler decides when and how many UEs will be allowed to do so. A request for transmission contains data about the state of the transmission buffer and the queue at the UE 130 and its available power margin. In addition to this scheduled mode of transmission, the standards also allow a self-initiated transmission mode from the UEs 130, denoted non-scheduled. The non-scheduled mode can, for example, be used for VoIP (voice over IP) services for example.

It is noted that each MAC-d flow (e.g., quality of service (QoS) flow) can be configured to use either scheduled or non-scheduled modes, where the UE 130 adjusts the data rate for scheduled and non-scheduled flows independently. The maximum data rate of each non-scheduled flow can be configured at call setup. The power used by the scheduled flows is controlled dynamically by the Node B 120 through absolute grant (consisting of an actual value) and relative grant (consisting of a single up/down bit) messages. At Layer 1 for example of the MAC, HSUPA introduces new physical channels E-AGCH (Absolute Grant Channel), E-RGCH (Relative Grant Channel), Dedicated Physical Channel (DPCH), F-DPCH (Fractional-DPCH), E-HICH (E-DCH Hybrid ARQ Indicator Channel), E-DPCCH (E-DCH Dedicated Physical Control Channel) and E-DPDCH (E-DCH Dedicated Physical Data Channel). Generally, E-DPDCH is utilized to carry the E-DCH Transport Channel and E-DPCCH is used to carry the control information associated with the E-DCH. The discussion for FIG. 2 below defines the new Secondary Active Set and Secondary E-DCH Active Set for the secondary uplink carriers. FIG. 3 discusses the limitations on the membership in these sets, whereas FIG. 4 describes a method for soft and softer handover behavior.

It is noted that the system 100 can be employed with an access terminal or mobile device, and can be, for instance, a module such as an SD card, a network card, a wireless network card, a computer (including laptops, desktops, personal digital assistants (PDAs)), mobile phones, smart phones, or any other suitable terminal that can be utilized to access a network. The terminal accesses the network by way of an access component (not shown). In one example, a connection between the terminal and the access components may be wireless in nature, in which access components may be the base station and the mobile device is a wireless terminal. For instance, the terminal and base stations may communicate by way of any suitable wireless protocol, including but not limited to Time Divisional Multiple Access (TDMA), Code Division Multiple Access (CDMA), Frequency Division Multiple Access (FDMA), Orthogonal Frequency Division Multiplexing (OFDM), FLASH OFDM, Orthogonal Frequency Division Multiple Access (OFDMA), or any other suitable protocol.

Access components can be an access node associated with a wired network or a wireless network. To that end, access components can be, for instance, a router, a switch, or the like. The access component can include one or more interfaces, e.g., communication modules, for communicating with other network nodes. Additionally, the access component can be a base station (or wireless access point) in a cellular type network, wherein base stations (or wireless access points) are utilized to provide wireless coverage areas to a plurality of subscribers. Such base stations (or wireless access points) can be arranged to provide contiguous areas of coverage to one or more cellular phones and/or other wireless terminals.

Figure 2:
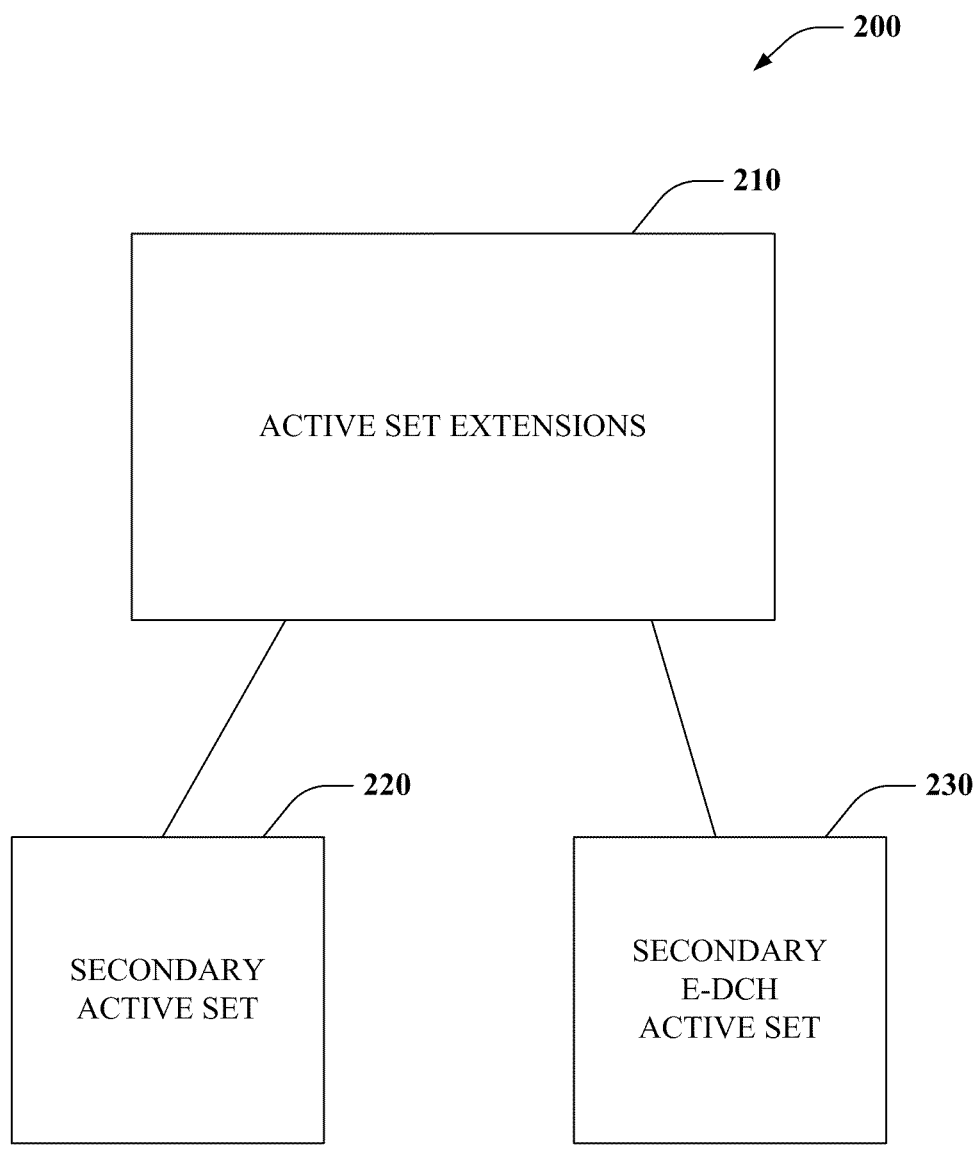
FIG. 2 is a diagram that illustrates Secondary Active Set and Secondary E-DCH Active Sets for secondary uplink carriers.
Figure 3:
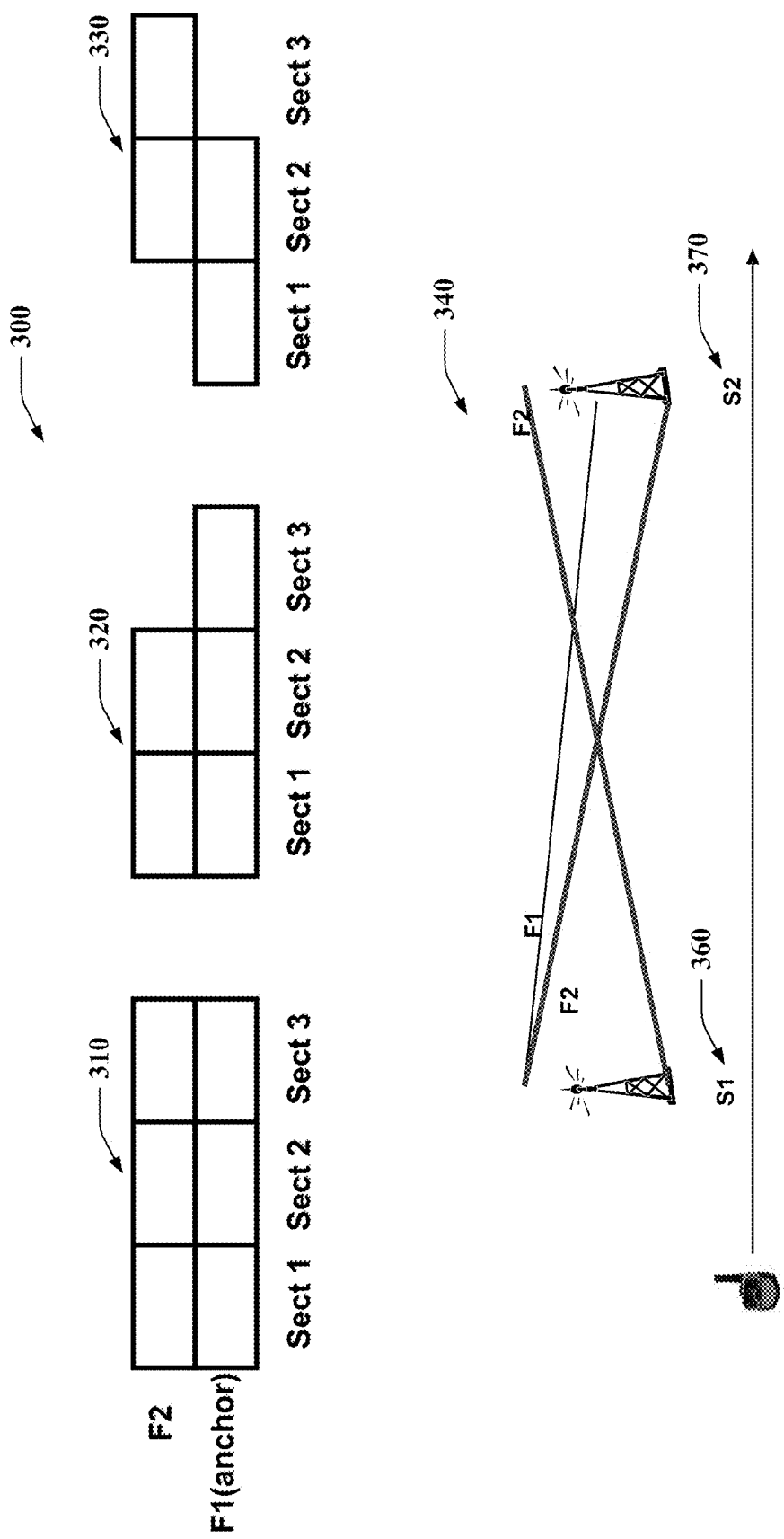
FIG. 3 is a diagram that illustrates example membership rules for secondary active sets.

FIG. 2 is a diagram 200 illustrates Secondary Active Set and Secondary E-DCH Active Sets for secondary uplink carriers. For dual-cell high speed downlink packet access (DC-HSDPA), the active set generally only contains the sectors on the serving high speed dedicated shared channel (HS-DSCH) cell frequency. This frequency can be referred to as an anchor carrier. One of the motivations for only including the sectors on the anchor carrier is simplicity and the existence of a single uplink.

In dual-cell high speed downlink packet access (DC-HSUPA), extension to the active set definition is provided at 210 for the addition of the second uplink carrier. As noted above, more than two carriers can be supported. However, the term 'active set' is used extensively throughout radio resource control (RRC) protocols. For example, it is used in measurement control messages and mobility event triggers. Therefore, it is more suitable to define a new set for cells on the secondary carrier than to modify the original active set. Therefore, following new definitions are generated and processed:

At 220, a Secondary Active Set is the set of cells on the secondary downlink and uplink carrier where F-DPCH is transmitted on the downlink for uplink power control. At 230, a Secondary E-DCH Active Set is the set of cells on the secondary downlink and uplink carrier where E-DCH is carried for at least one UE. A power control bit combining for the secondary uplink carrier can be applied to all the cells in the Secondary Active Set. The Serving Grant update for the secondary uplink carrier combines the E-RGCH from all the cells generally in the Secondary E-DCH Active Set. On the anchor carrier, the E-DCH Active Set is a subset of the Active Set 210. On the secondary carrier, due to the absence of DPDCH on the uplink, the Secondary E-DCH Active Set 230 is the same as the Secondary Active Set 220 defined above.

FIG. 3 is a diagram 300 that illustrates example membership rules for secondary active sets. In one aspect, the serving cell for both uplink carriers can be the same. There are at least three possible compositions of the active set and Secondary Active Set of a DC-HSUPA user equipment, as illustrated at 300 of FIG. 3:

Composition 1 at 310 of FIG. 3: The same sectors are on both sets.

Composition 2 at 320 of FIG. 3: The sectors on the Secondary Active Set form a subset of those on the active set.

Composition 3 at 330 of FIG. 3: The set of sectors on both sets are independent. However, at anytime, the serving cell on both carriers generally belongs to the same sector.

In the beginning of DC HSUPA deployment, there can be boundaries between Node B's with and without DC HSUPA. At such boundaries, Composition 2 at 320 and Composition 3 at 330 can be supported.

If the secondary carrier is only partially deployed whereas the anchor carrier is universally deployed, Configuration 2 at 220 supports smooth serving cell changes since both Sector 1 and Sector 2 can be the serving sector. To observe the utility of Configuration 3 at 330, consider the mobility scenario depicted at diagram 340 where a UE 350 is leaving a hotspot 360 (Sector 1, or S1) with frequencies F1 and F2. Generally, only F2 is supported by Sector 2 (S2) at 370. Because of load balancing, the UE's current anchor carrier is assumed to be F1. When the UE 350 moves towards S2 at 370, F1 decays slower than F2 due to the lack of interference. If S2 at 370 is not added to the Secondary Active Set in time, the UE 350 may not be power controlled or rate controlled by S2 and therefore may cause interference to S2. In general, all three configurations 310-330 should be supported. This implies independence between the Primary Active Set and the Secondary Active Set, and independence between the Primary E-DCH Active Set and the Secondary E-DCH Active Set, for example.

To maintain the independence between the Primary Active Set and the Secondary Active Set, the intra-frequency events, the Event 1x, are independently triggered on each carrier. The secondary carrier is considered as 'used frequency' for the Event 1x. Before proceeding, it is noted that all the mobility events can be considered processed as 'anchor based.' In another aspect, a subset of the mobility events can be considered and processed as anchor-based.

In the example shown at 340, the UE 350 triggers Event 1A on F2 in order to add Sector 2 at 370 to the Secondary Active Set. If the UE 350 can trigger Event 1D on F2, its serving cell can be changed to Sector 2 at 370 when Sector 2 on F2 is stronger than Sector 1 at 360 on F2. Such a serving cell change can also change the anchor carrier to F2. On the other hand, if the UE 350 cannot trigger Event 1D on F2, the serving cell change to Sector 2 at 370 can occur after F2 on Sector 2 becomes stronger than F1 on Sector 1. As observed at 340, F1 decays very slowly due to the lack of interference. Therefore, without triggering Event 1D on F2, the UE 350 can suffer from poor uplink performance due to large path loss to Sector 1 at 360 on the uplink of F1, and at the same time, the UE may cause interference on F2 to Sector 2 at 370. Consequently, the UE 350 should trigger Event 1D independently on each carrier. It is noted that the switch between anchor and secondary carrier can executed through Event 2A, for example.

Since Event 1x can be triggered on both carriers, to reduce the delay in the mobility events, the UE 350 frequently searches on the secondary carrier. Furthermore, when the secondary carrier is de-activated by either the RNC or Node B, the UE 350 monitors the channel conditions on the secondary carrier for mobility events. In general, the two carriers in DC HSUPA are adjacent. There is an optional capability for DC HSDPA UE of searching the secondary frequency without the compressed mode. In general, the following considerations are summarized: The active sets on both carriers are independent. The E-DCH active sets on both carriers are also independent; The intra-frequency events, including Event 1D, are independently triggered on each carrier; The secondary carrier is considered as 'used frequency' for intra-frequency mobility events. The serving cell on both carriers should be the same; The secondary carrier is considered as 'non-used frequency' for inter-frequency mobility events. The switching between the anchor and secondary frequency can be executed through Event 2A; and The UE search capability on the secondary frequency without the compressed mode should be mandatory.

Composition 3 at 330 may be limited. For example, adding a sector to the secondary active set should be tied to adding the same sector to the active set. Otherwise, the UE can't change its serving sector to a sector without the anchor carrier. At the boundary of DC HSUPA and non DC HSUPA deployment, if the anchor carrier is not as universally deployed as the secondary carrier, Event 2a can be used to change the anchor carrier. With the measurement report triggered by Event 2a, the network should be able to configure a complete active set based on the new anchor carrier. If the UE has the search capability on the secondary carrier without the compressed mode, the inter-frequency measurements can be obtained without service interruption.

Composition 3 at 330 also has additional complexity in mobility triggers. For Composition 3 to be effective, anchor based mobility should be amended. For example, cross-frequency comparison may be needed to trigger Event 1x so that the new sector on the secondary carrier can be added with adding the same sector on the anchor carrier. Therefore, it is proposed to allow Composition 1 at 310 and Composition 2 at 320. Namely, the sectors in the secondary active set are the same or a subset of the sectors in the active set. Similarly, the sectors in the secondary E-DCH active set should be the same or a subset of the sectors in the E-DCH active set. Furthermore, a sector can be added to or deleted from the secondary active set when the same sector is added to or deleted from the active set. Also, mobility triggers for Event 1x can be anchor-based.

Figure 4:
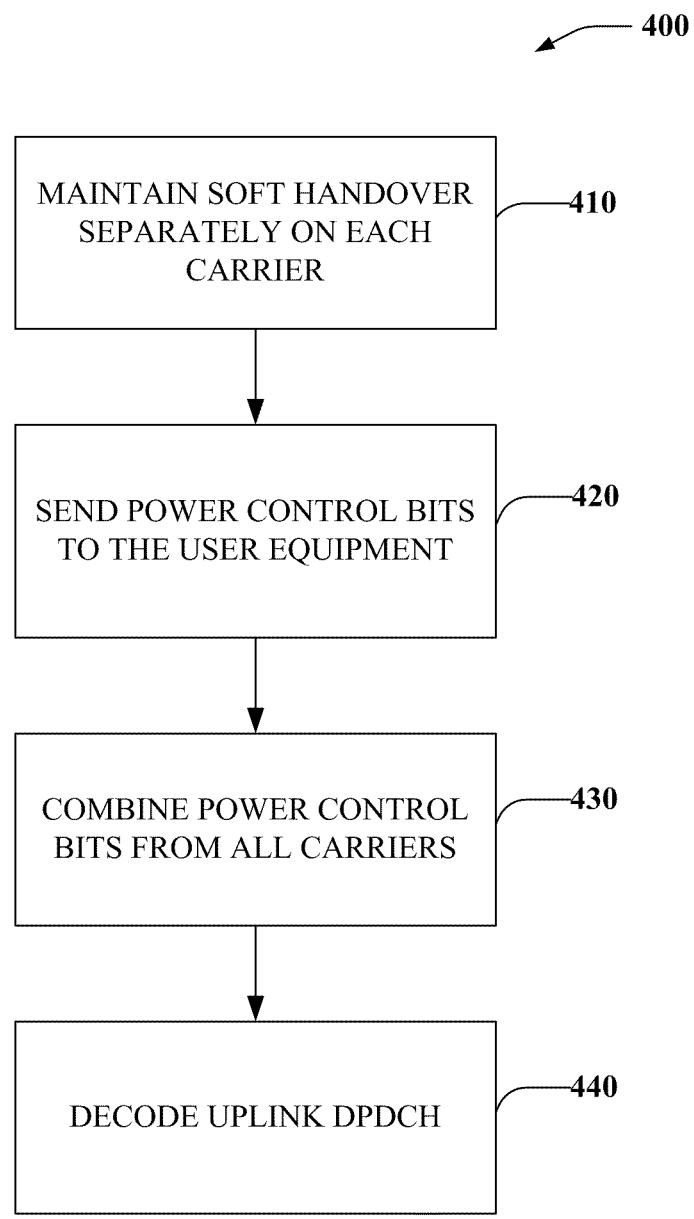
FIG. 4 is a flow diagram that describes a method for soft and softer handover behavior.
Figure 5:
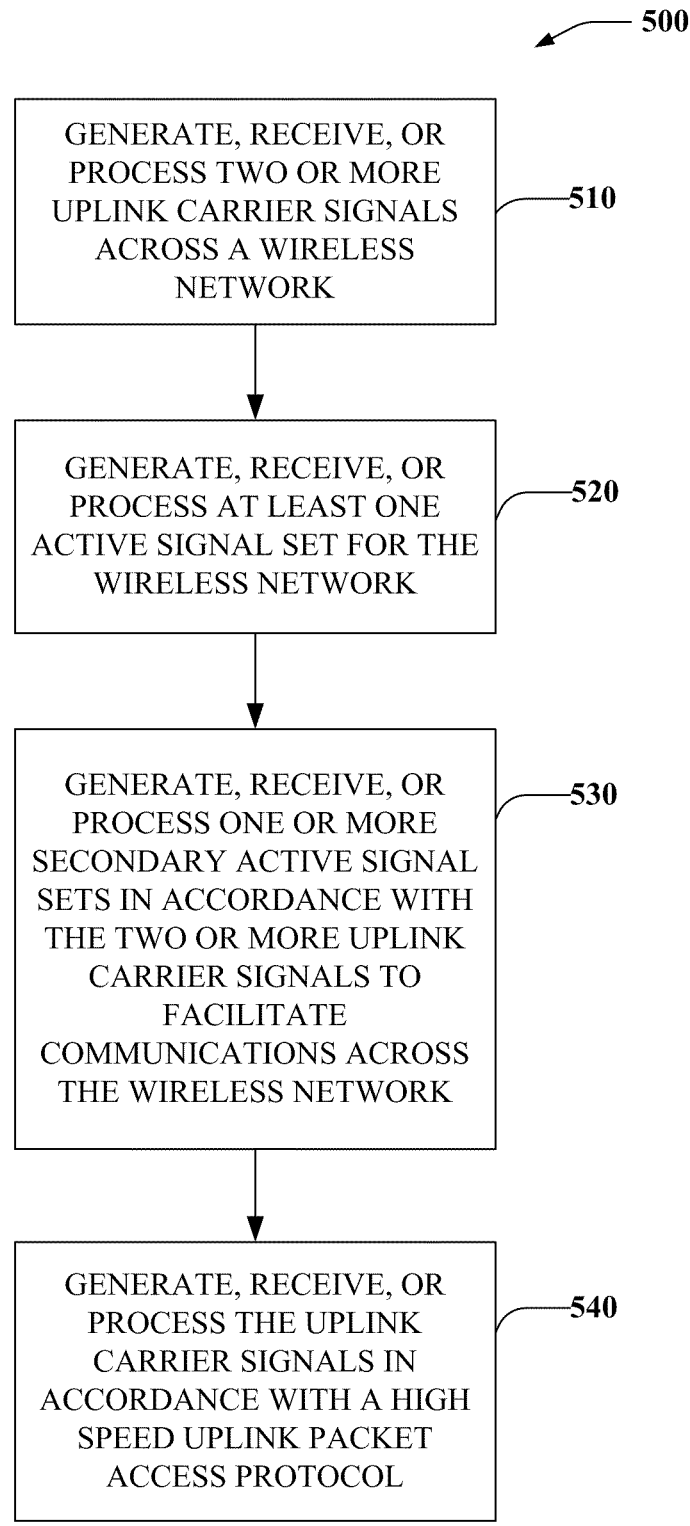
FIG. 5 is a flow diagram that describes a method for secondary set generation and processing.

Referring now to FIGS. 4 and 5, example methodologies for multicarrier operations are illustrated. While, for purposes of simplicity of explanation, the methodologies (and other methodologies described herein) are shown and described as a series of acts, it is to be understood and appreciated that the methodologies are not limited by the order of acts, as some acts may, in accordance with one or more aspects, occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be utilized to implement a methodology in accordance with the claimed subject matter. In general, the methodologies can be implemented as processor instructions, logical programming functions, or other electronic sequence that supports independent multicarrier power control described herein.

FIG. 4 is a flow diagram that describes a method 400 for soft handover behavior. With the above restrictions, soft and softer handover are maintained at 410 separately on each carrier although the sectors in Secondary Active Set are the same or a subset of the sectors in the Active Set. At 420, each cell in each set sends power control bits to the UE, based on the received energy of pilot chip versus noise and total interference parameter (Ecp/Nt) at each RLS on that carrier. At 430, the UE combines power control bits on each carrier from all the cells on that carrier in the active set/Secondary Active Set. At 440, all the cells in the active set on the anchor carrier try to decode uplink Dedicated Physical Data Channel (DP-DCH) and the selection can be performed at the RNC, for example.

It is noted that the E-DCH Active Set is a subset of the Active Set. The Secondary E-DCH Active Set can be the same as the Secondary Active Set. Generally, the serving cell on each carrier sends E-AGCH and E-RGCH for grants on that carrier. Each non-serving RLS in the E-DCH active set sends non-serving E-RGCH on each carrier also. Generally, all the sectors on each carrier attempt to decode the user equipment E-DPDCH and E-DPCCH, where the selection combining is performed at RNC.

FIG. 5 is a flow diagram that describes a wireless communications method 500 for secondary set generation and processing. At 510, the method includes generating (or receiving/processing) two or more uplink carrier signals across a wireless network. At 520, the method includes generating (or receiving/processing) at least one active signal set for the wireless network. At 530, the method includes generating (or receiving/processing) one or more secondary active signal sets in accordance with the two or more uplink carrier signals to facilitate communications across the wireless network. At 540, the uplink carrier signals are generated in accordance with a high speed uplink packet access protocol.

In another aspect, the secondary active signal sets include an enhanced dedicated channel (E-DCH). The secondary active signal sets are generated for cells on a secondary uplink carrier with a fractional dedicated physical channel (F-DPCH). The method 500 also includes generating a secondary E-DCH active set for cells on a secondary uplink carrier with an enhanced hybrid ARQ indicator channel (E-HICH). This includes generating secondary active signal sets in a similar manner or as a subset of one or more sectors in the active signal set. The method also includes generating a secondary E-DCH active set in a similar manner as the secondary active sets. This includes generating one or more sectors in the secondary E-DCH active set in a similar manner or a subset of one or more sectors in an E-DCH active set. This also includes generating one or more mobility events that are anchor-based events. The method 500 includes adding or deleting a sector from a secondary active set or secondary E-DCH active set when the same sector is added to or deleted from an active signal set or an active E-DCH set. This can includes generating a power control bit for a secondary uplink carrier and applying the bit to all cells in a secondary active set. This also includes employing an Event 2a to change an anchor carrier. This includes generating a smooth handover between carriers and includes processing one or more power control bits based on a received energy of pilot chip versus noise and total interference parameter (Ecp/Nt).

The techniques processes described herein may be implemented by various means. For example, these techniques may be implemented in hardware, software, or a combination thereof. For a hardware implementation, the processing units may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof. With software, implementation can be through modules (e.g., procedures, functions, and so on) that perform the functions described herein. The software codes may be stored in memory unit and executed by the processors.

Figure 6:
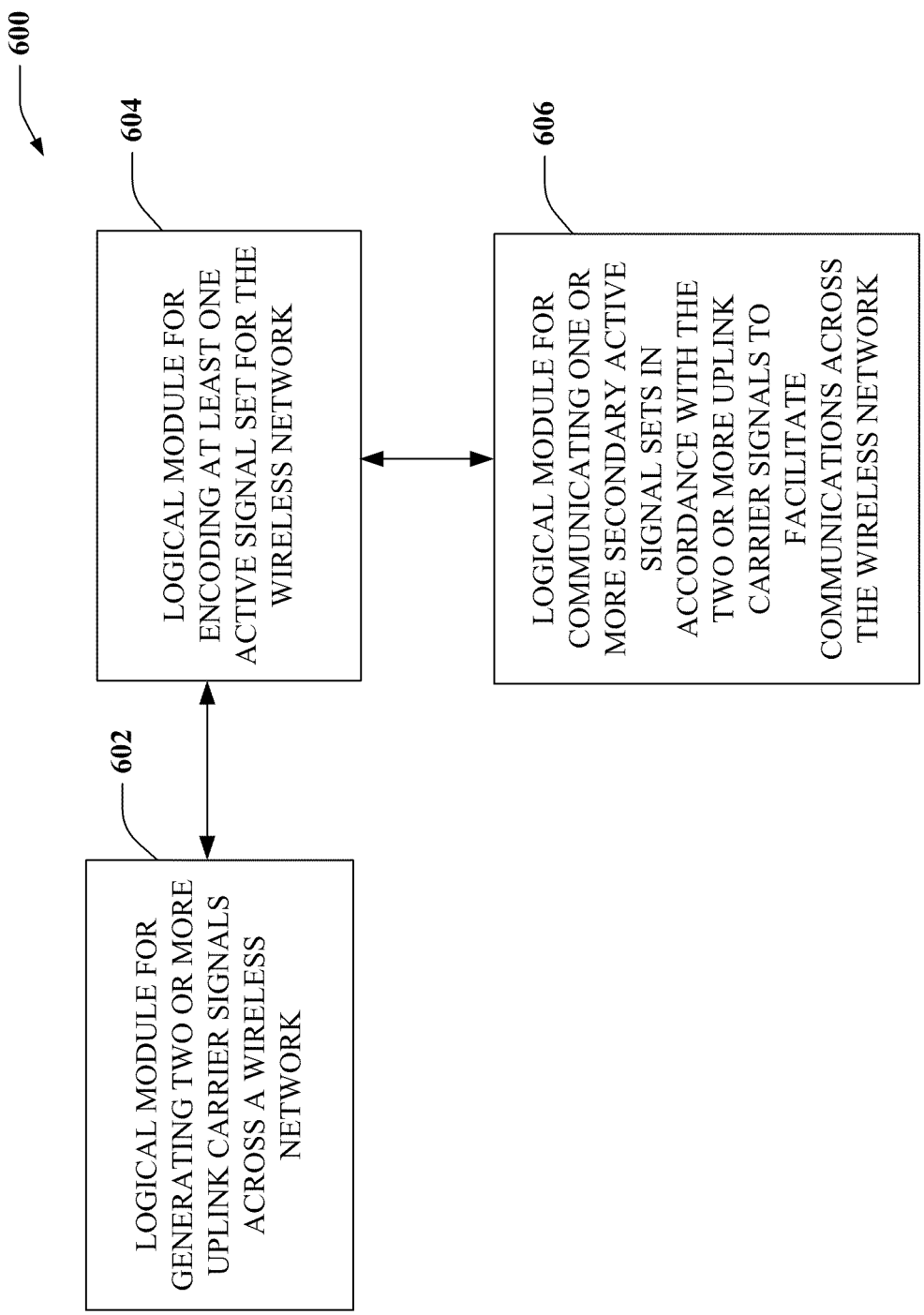
FIG. 6 illustrates an example logical module for multicarrier operations.
Figure 7:
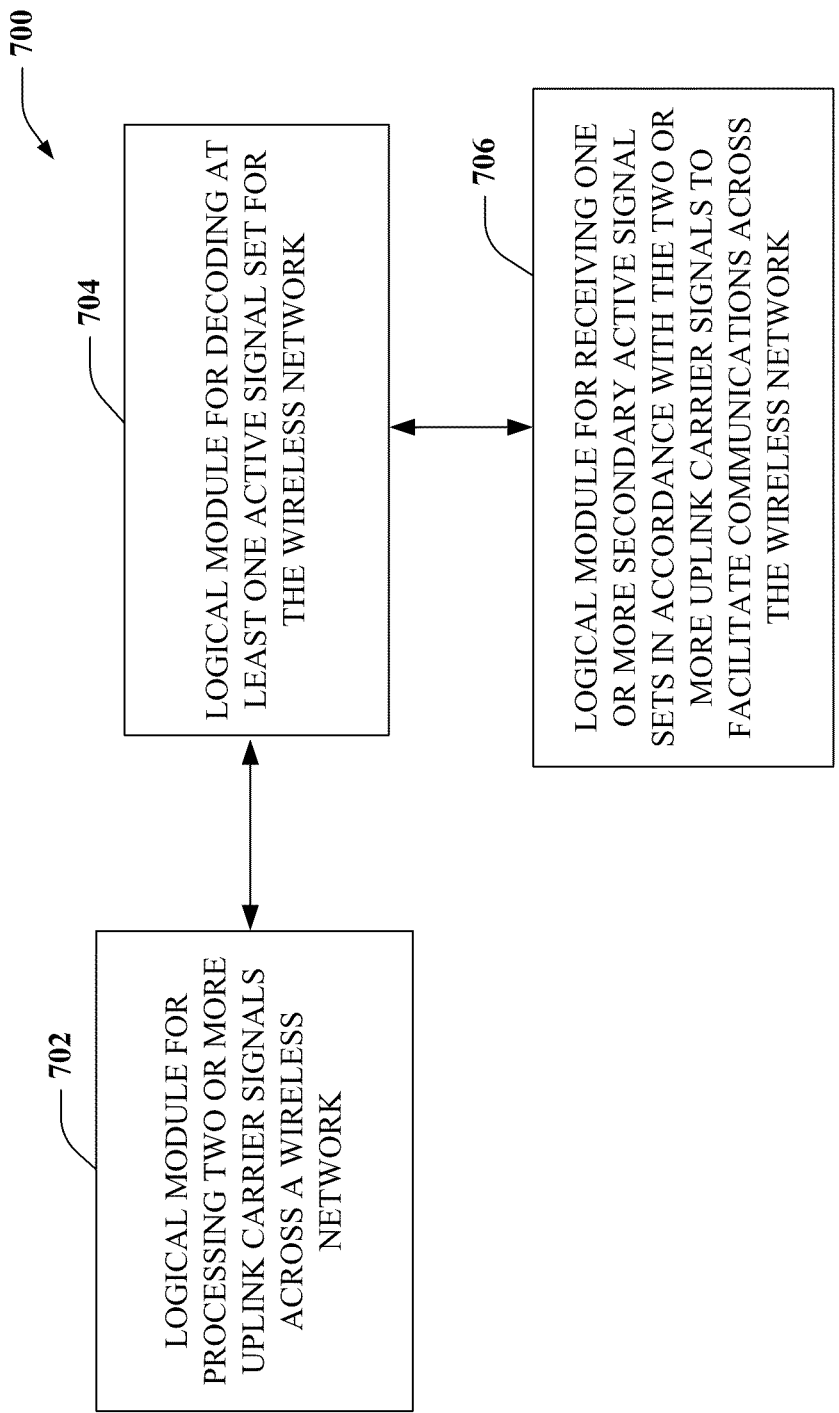
FIG. 7 illustrates an example logical module for alternative multicarrier operations.

Turning now to FIGS. 6 and 7, a system is provided that relates to wireless signal processing. The systems are represented as a series of interrelated functional blocks, which can represent functions implemented by a processor, software, hardware, firmware, or any suitable combination thereof.

Referring to FIG. 6, a wireless communication system 600 is provided. The system 600 includes a logical module 602 or means for generating two or more uplink carrier signals across a wireless network and a logical module 604 or means for encoding at least one active signal set for the wireless network. This includes a logical module 606 or means for communicating one or more secondary active signal sets in accordance with the two or more uplink carrier signals to facilitate communications across the wireless network.

Referring to FIG. 7, a wireless communication system 700 is provided. The system 700 includes a logical module 702 or means for processing two or more uplink carrier signals across a wireless network. This includes a logical module 704 or means for decoding at least one active signal set for the wireless network. This also includes a logical module 706 or means for receiving one or more secondary active signal sets in accordance with the two or more uplink carrier signals to facilitate communications across the wireless network.

In another aspect, a communications apparatus is provided. This includes a memory that retains instructions for generating two or more uplink carrier signals across a wireless network, encoding at least one active signal set for the wireless network, and encoding one or more secondary active signal sets in accordance with the two or more uplink carrier signals to facilitate communications across the wireless network; and a processor that executes the instructions.

In another aspect, a computer program product is provided. This includes a computer-readable medium that includes code for multicarrier operations, the code comprising: code for causing a computer to transmit two or more uplink carrier signals across a wireless network; code for causing a computer to generate at least one active signal set for the wireless network; and code for causing a computer to encode one or more secondary active signal sets in accordance with the two or more uplink carrier signals to facilitate communications across the wireless network.

In yet another aspect, a wireless communications method is provided. The method include receiving two or more uplink carrier signals across a wireless network; processing at least one active signal set for the wireless network; and processing one or more secondary active signal sets in accordance with the two or more uplink carrier signals to facilitate communications across the wireless network.

In another aspect, a communications apparatus is provided. This includes a memory that retains instructions for processing two or more uplink carrier signals across a wireless network, decoding at least one active signal set for the wireless network, and decoding one or more secondary active signal sets in accordance with the two or more uplink carrier signals to facilitate communications across the wireless network; and a processor that executes the instructions.

In another aspect, a computer program product is provided. This includes a computer-readable medium that includes code for multicarrier operations, the code comprising: code for causing a computer to receive two or more uplink carrier signals across a wireless network; code for causing a computer to process at least one active signal set for the wireless network; and code for causing a computer to decode one or more secondary active signal sets in accordance with the two or more uplink carrier signals to facilitate communications across the wireless network. In yet another aspect, a wireless communications method is provided. The method includes processing two or more uplink carrier signals in a wireless receiver; processing at least one active signal set and at least one secondary active signal set in the wireless receiver; and providing a search capability for the wireless receiver in accordance with a secondary frequency, where the search capability can be generated in a non-compressed mode. This can also include generating a smooth handover between carriers. This includes generating one or more mobility events that are anchor-based events or generating one or more independent mobility events per carrier.

Figure 8:
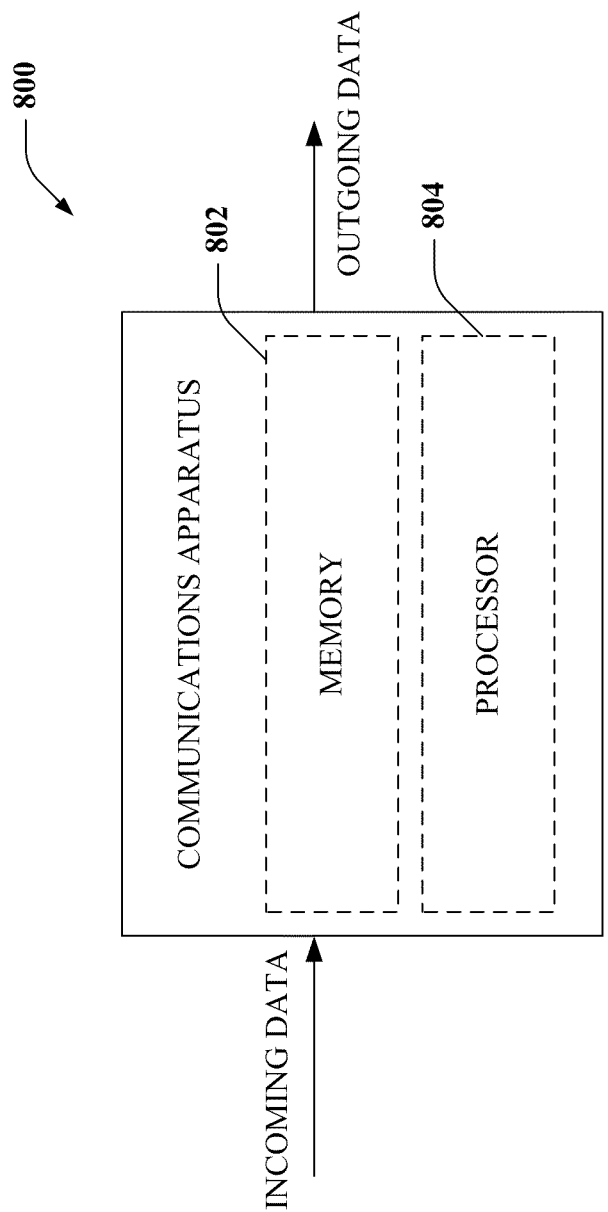
FIG. 8 illustrates an example communications apparatus that employ multicarrier operations.

FIG. 8 illustrates a communications apparatus 800 that can be a wireless communications apparatus, for instance, such as a wireless terminal Additionally or alternatively, communications apparatus 800 can be resident within a wired network. Communications apparatus 800 can include memory 802 that can retain instructions for performing a signal analysis in a wireless communications terminal Additionally, communications apparatus 800 may include a processor 804 that can execute instructions within memory 802 and/or instructions received from another network device, wherein the instructions can relate to configuring or operating the communications apparatus 800 or a related communications apparatus.

Figure 9:
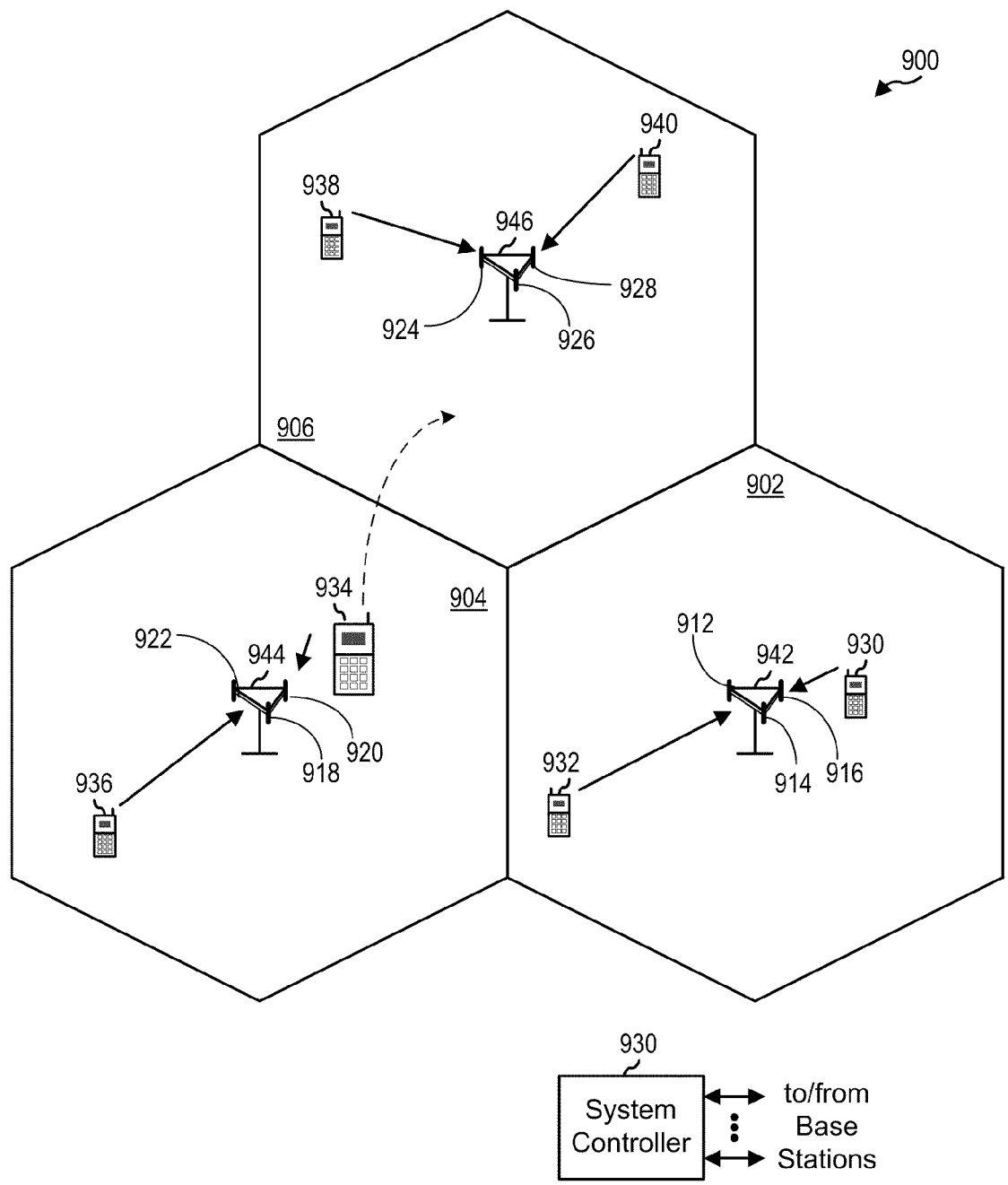
FIG. 9 illustrates a multiple access wireless communication system.

Referring to FIG. 9, a multiple access wireless communication system 900 is illustrated. The multiple access wireless communication system 900 includes multiple cells, including cells 902, 904, and 906. In the aspect the system 900, the cells 902, 904, and 906 may include a Node B that includes multiple sectors. The multiple sectors can be formed by groups of antennas with each antenna responsible for communication with UEs in a portion of the cell. For example, in cell 902, antenna groups 912, 914, and 916 may each correspond to a different sector. In cell 904, antenna groups 918, 920, and 922 each correspond to a different sector. In cell 906, antenna groups 924, 926, and 928 each correspond to a different sector. The cells 902, 904 and 906 can include several wireless communication devices, e.g., User Equipment or UEs, which can be in communication with one or more sectors of each cell 902, 904 or 906. For example, UEs 930 and 932 can be in communication with Node B 942, UEs 934 and 936 can be in communication with Node B 944, and UEs 938 and 940 can be in communication with Node B 946.

Figure 10:
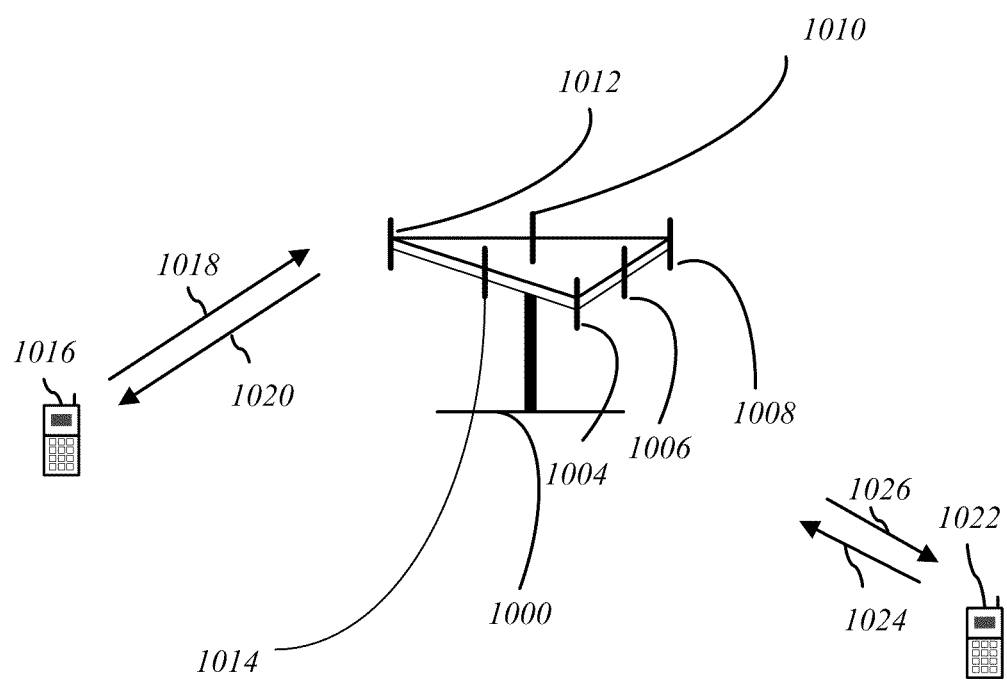
FIGS. 10 and 11 illustrate example communications systems.

Referring now to FIG. 10, a multiple access wireless communication system according to one aspect is illustrated. An access point 1000 (AP) includes multiple antenna groups, one including 1004 and 1006, another including 1008 and 1010, and an additional including 1012 and 1014. In FIG. 10, only two antennas are shown for each antenna group, however, more or fewer antennas may be utilized for each antenna group. Access terminal 1016 (AT) is in communication with antennas 1012 and 1014, where antennas 1012 and 1014 transmit information to access terminal 1016 over forward link 1020 and receive information from access terminal 1016 over reverse link 1018. Access terminal 1022 is in communication with antennas 1006 and 1008, where antennas 1006 and 1008 transmit information to access terminal 1022 over forward link 1026 and receive information from access terminal 1022 over reverse link 1024. In a FDD system, communication links 1018, 1020, 1024 and 1026 may use different frequency for communication. For example, forward link 1020 may use a different frequency then that used by reverse link 1018.

Each group of antennas and/or the area in which they are designed to communicate is often referred to as a sector of the access point. Antenna groups each are designed to communicate to access terminals in a sector, of the areas covered by access point 1000. In communication over forward links 1020 and 1026, the transmitting antennas of access point 1000 utilize beam-forming in order to improve the signal-to-noise ratio of forward links for the different access terminals 1016 and 1024. Also, an access point using beam-forming to transmit to access terminals scattered randomly through its coverage causes less interference to access terminals in neighboring cells than an access point transmitting through a single antenna to all its access terminals. An access point may be a fixed station used for communicating with the terminals and may also be referred to as an access point, a Node B, or some other terminology. An access terminal may also be called an access terminal, user equipment (UE), a wireless communication device, terminal, access terminal or some other terminology.

Figure 11:
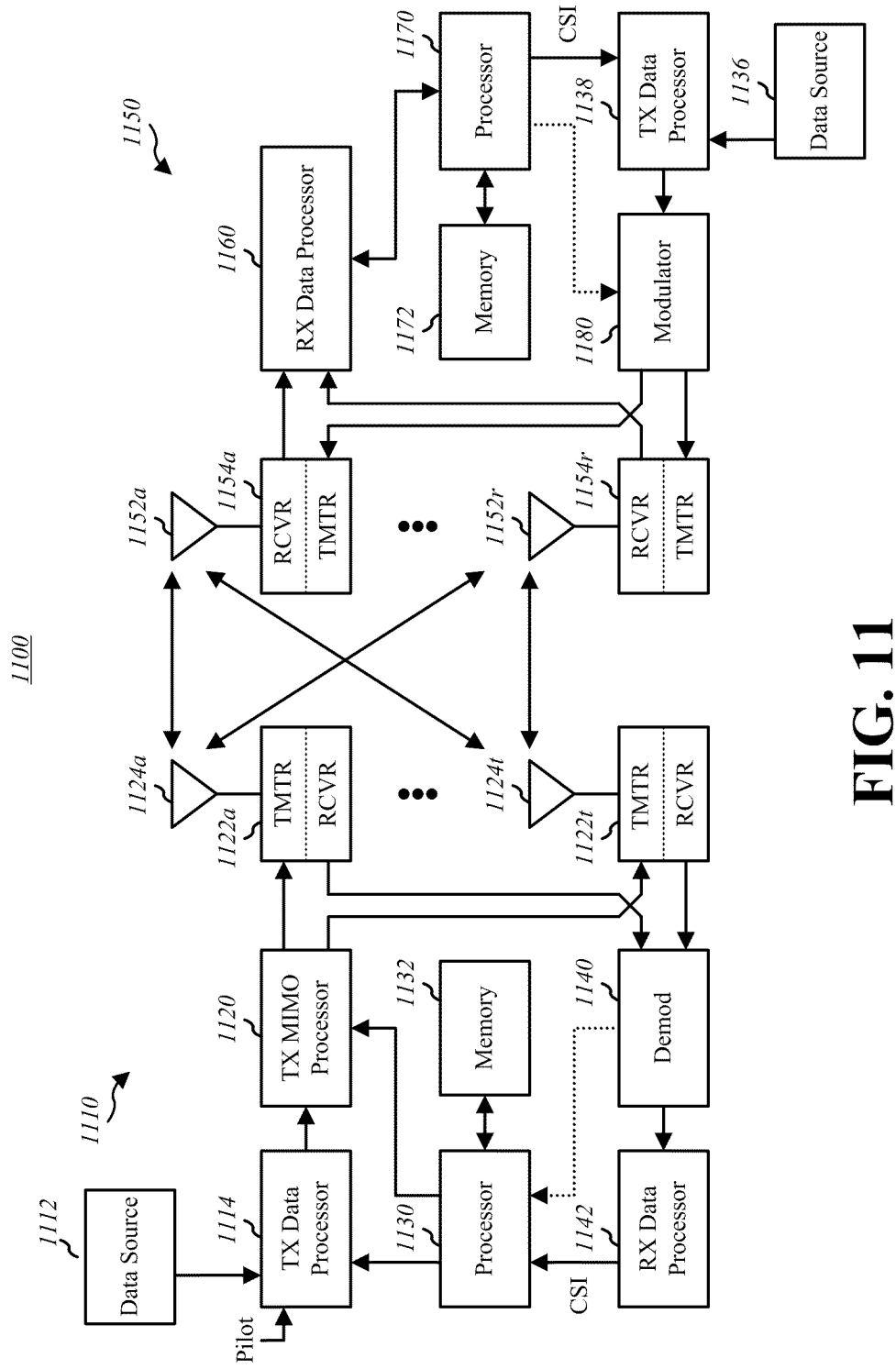

Referring to FIG. 11, a system 1100 illustrates a transmitter system 210 (also known as the access point) and a receiver system 1150 (also known as access terminal) in a MIMO system 1100. At the transmitter system 1110, traffic data for a number of data streams is provided from a data source 1112 to a transmit (TX) data processor 1114. Each data stream is transmitted over a respective transmit antenna. TX data processor 1114 formats, codes, and interleaves the traffic data for each data stream based on a particular coding scheme selected for that data stream to provide coded data.

The coded data for each data stream may be multiplexed with pilot data using OFDM techniques. The pilot data is typically a known data pattern that is processed in a known manner and may be used at the receiver system to estimate the channel response. The multiplexed pilot and coded data for each data stream is then modulated (i.e., symbol mapped) based on a particular modulation scheme (e.g., BPSK, QSPK, M-PSK, or M-QAM) selected for that data stream to provide modulation symbols. The data rate, coding, and modulation for each data stream may be determined by instructions performed by processor 1130.

The modulation symbols for all data streams are then provided to a TX MIMO processor 1120, which may further process the modulation symbols (e.g., for OFDM). TX MIMO processor 1120 then provides NT modulation symbol streams to NT transmitters (TMTR) 1122a through 1122t. In certain embodiments, TX MIMO processor 1120 applies beam-forming weights to the symbols of the data streams and to the antenna from which the symbol is being transmitted.

Each transmitter 1122 receives and processes a respective symbol stream to provide one or more analog signals, and further conditions (e.g., amplifies, filters, and up-converts) the analog signals to provide a modulated signal suitable for transmission over the MIMO channel. NT modulated signals from transmitters 1122a through 1122t are then transmitted from NT antennas 1124a through 1124t, respectively.

At receiver system 1150, the transmitted modulated signals are received by NR antennas 1152a through 1152r and the received signal from each antenna 1152 is provided to a respective receiver (RCVR) 1154a through 1154r. Each receiver 1154 conditions (e.g., filters, amplifies, and down-converts) a respective received signal, digitizes the conditioned signal to provide samples, and further processes the samples to provide a corresponding "received" symbol stream.

An RX data processor 1160 then receives and processes the NR received symbol streams from NR receivers 1154 based on a particular receiver processing technique to provide NT "detected" symbol streams. The RX data processor 1160 then demodulates, de-interleaves, and decodes each detected symbol stream to recover the traffic data for the data stream. The processing by RX data processor 1160 is complementary to that performed by TX MIMO processor 1120 and TX data processor 1114 at transmitter system 1110.

A processor 1170 periodically determines which pre-coding matrix to use (discussed below). Processor 1170 formulates a reverse link message comprising a matrix index portion and a rank value portion. The reverse link message may comprise various types of information regarding the communication link and/or the received data stream. The reverse link message is then processed by a TX data processor 1138, which also receives traffic data for a number of data streams from a data source 1136, modulated by a modulator 1180, conditioned by transmitters 1154a through 1154r, and transmitted back to transmitter system 1110. Parameters include resource allocation parameters, interference condition parameters, signal strength parameters, signal quality parameters, quality.

At transmitter system 1110, the modulated signals from receiver system 1150 are received by antennas 1124, conditioned by receivers 1122, demodulated by a demodulator 1140, and processed by a RX data processor 1142 to extract the reserve link message transmitted by the receiver system 1150. Processor 1130 then determines which pre-coding matrix to use for determining the beam-forming weights then processes the extracted message.

In an aspect, logical channels are classified into Control Channels and Traffic Channels. Logical Control Channels comprises Broadcast Control Channel (BCCH) which is DL channel for broadcasting system control information. Paging Control Channel (PCCH) which is DL channel that transfers paging information. Multicast Control Channel (MCCH) which is Point-to-multipoint DL channel used for transmitting Multimedia Broadcast and Multicast Service (MBMS) scheduling and control information for one or several MTCHs. Generally, after establishing RRC connection this channel is only used by UEs that receive MBMS (Note: old MCCH+MSCH). Dedicated Control Channel (DCCH) is Point-to-point bi-directional channel that transmits dedicated control information and used by UEs having an RRC connection. Logical Traffic Channels comprise a Dedicated Traffic Channel (DTCH) which is Point-to-point bi-directional channel, dedicated to one UE, for the transfer of user information. Also, a Multicast Traffic Channel (MTCH) for Point-to-multipoint DL channel for transmitting traffic data.

Transport Channels are classified into DL and UL. DL Transport Channels comprises a Broadcast Channel (BCH), Downlink Shared Data Channel (DL-SDCH) and a Paging Channel (PCH), the PCH for support of UE power saving (DRX cycle is indicated by the network to the UE), broadcasted over entire cell and mapped to PHY resources which can be used for other control/traffic channels. The UL Transport Channels comprises a Random Access Channel (RACH), a Request Channel (REQCH), an Uplink Shared Data Channel (UL-SDCH) and plurality of PHY channels. The PHY channels comprise a set of DL channels and UL channels.

The DL PHY channels comprises: Common Pilot Channel (CPICH), Synchronization Channel (SCH), Common Control Channel (CCCH), Shared DL Control Channel (SDCCH), Multicast Control Channel (MCCH), Shared UL Assignment Channel (SUACH), Acknowledgement Channel (ACKCH), DL Physical Shared Data Channel (DL-PSDCH), UL Power Control Channel (UPCCH), Paging Indicator Channel (PICH), and Load Indicator Channel (LICH), for example.

The UL PHY Channels comprises: Physical Random Access Channel (PRACH), Channel Quality Indicator Channel (CQICH), Acknowledgement Channel (ACKCH), Antenna Subset Indicator Channel (ASICH), Shared Request Channel (SREQCH), UL Physical Shared Data Channel (UL-PSDCH), and Broadband Pilot Channel (BPICH), for example.

Other terms/components include: 3G 3rd Generation, 3GPP 3rd Generation Partnership Project, ACLR Adjacent channel leakage ratio, ACPR Adjacent channel power ratio, ACS Adjacent channel selectivity, ADS Advanced Design System, AMC Adaptive modulation and coding, A-MPR Additional maximum power reduction, ARQ Automatic repeat request, BCCH Broadcast control channel, BTS Base transceiver station, CDD Cyclic delay diversity, CCDF Complementary cumulative distribution function, CDMA Code division multiple access, CFI Control format indicator, Co-MIMO Cooperative MIMO, CP Cyclic prefix, CPICH Common pilot channel, CPRI Common public radio interface, CQI Channel quality indicator, CRC Cyclic redundancy check, DCI Downlink control indicator, DFT Discrete Fourier transform, DFT-SOFDM Discrete Fourier transform spread OFDM, DL Downlink (base station to subscriber transmission), DL-SCH Downlink shared channel, D-PHY 500 Mbps physical layer, DSP Digital signal processing, DT Development toolset, DVSA Digital vector signal analysis, EDA Electronic design automation, E-DCH Enhanced dedicated channel, E-UTRAN Evolved UMTS terrestrial radio access network, eMBMS Evolved multimedia broadcast multicast service, eNB Evolved Node B, EPC Evolved packet core, EPRE Energy per resource element, ETSI European Telecommunications Standards Institute, E-UTRA Evolved UTRA, E-UTRAN Evolved UTRAN, EVM Error vector magnitude, and FDD Frequency division duplex.

Still yet other terms include FFT Fast Fourier transform, FRC Fixed reference channel, FS1 Frame structure type 1, FS2 Frame structure type 2, GSM Global system for mobile communication, HARQ Hybrid automatic repeat request, HDL Hardware description language, HI HARQ indicator, HSDPA High speed downlink packet access, HSPA High speed packet access, HSUPA High speed uplink packet access, IFFT Inverse FFT, IOT Interoperability test, IP Internet protocol, LO Local oscillator, LTE Long term evolution, MAC Medium access control, MBMS Multimedia broadcast multicast service, MBSFN Multicast/broadcast over single-frequency network, MCH Multicast channel, MIMO Multiple input multiple output, MISO Multiple input single output, MME Mobility management entity, MOP Maximum output power, MPR Maximum power reduction, MU-MIMO Multiple user MIMO, NAS Non-access stratum, OBSAI Open base station architecture interface, OFDM Orthogonal frequency division multiplexing, OFDMA Orthogonal frequency division multiple access, PAPR Peak-to-average power ratio, PAR Peak-to-average ratio, PBCH Physical broadcast channel, P-CCPCH Primary common control physical channel, PCFICH Physical control format indicator channel, PCH Paging channel, PDCCH Physical downlink control channel, PDCP Packet data convergence protocol, PDSCH Physical downlink shared channel, PHICH Physical hybrid ARQ indicator channel, PHY Physical layer, PRACH Physical random access channel, PMCH Physical multicast channel, PMI Pre-coding matrix indicator, P-SCH Primary synchronization signal, PUCCH Physical uplink control channel, and PUSCH Physical uplink shared channel.

Other terms include QAM Quadrature amplitude modulation, QPSK Quadrature phase shift keying, RACH Random access channel, RAT Radio access technology, RB Resource block, RF Radio frequency, RFDE RF design environment, RLC Radio link control, RMC Reference measurement channel, RNC Radio network controller, RRC Radio resource control, RRM Radio resource management, RS Reference signal, RSCP Received signal code power, RSRP Reference signal received power, RSRQ Reference signal received quality, RSSI Received signal strength indicator, SAE System architecture evolution, SAP Service access point, SC-FDMA Single carrier frequency division multiple access, SFBC Space-frequency block coding, S-GW Serving gateway, SIMO Single input multiple output, SISO Single input single output, SNR Signal-to-noise ratio, SRS Sounding reference signal, S-SCH Secondary synchronization signal, SU-MIMO Single user MIMO, TDD Time division duplex, TDMA Time division multiple access, TR Technical report, TrCH Transport channel, TS Technical specification, TTA Telecommunications Technology Association, TTI Transmission time interval, UCI Uplink control indicator, UE User equipment, UL Uplink (subscriber to base station transmission), UL-SCH Uplink shared channel, UMB Ultra-mobile broadband, UMTS Universal mobile telecommunications system, UTRA Universal terrestrial radio access, UTRAN Universal terrestrial radio access network, VSA Vector signal analyzer, W-CDMA Wideband code division multiple access It is noted that various aspects are described herein in connection with a terminal. A terminal can also be referred to as a system, a user device, a subscriber unit, subscriber station, mobile station, mobile device, remote station, remote terminal, access terminal, user terminal, user agent, or user equipment. A user device can be a cellular telephone, a cordless telephone, a Session Initiation Protocol (SIP) phone, a wireless local loop (WLL) station, a PDA, a handheld device having wireless connection capability, a module within a terminal, a card that can be attached to or integrated within a host device (e.g., a PCMCIA card) or other processing device connected to a wireless modem.

Moreover, aspects of the claimed subject matter may be implemented as a method, apparatus, or article of manufacture using standard programming and/or engineering techniques to produce software, firmware, hardware, or any combination thereof to control a computer or computing components to implement various aspects of the claimed subject matter. The term "article of manufacture" as used herein is intended to encompass a computer program accessible from any computer-readable device, carrier, or media. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ). Additionally it should be appreciated that a carrier wave can be employed to carry computer-readable electronic data such as those used in transmitting and receiving voice mail or in accessing a network such as a cellular network. Of course, those skilled in the art will recognize many modifications may be made to this configuration without departing from the scope or spirit of what is described herein.

As used in this application, the terms "component," "module," "system," "protocol," and the like are intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server can be a component. One or more components may reside within a process and/or thread of execution and a component may be localized on one computer and/or distributed between two or more computers.

What has been described above includes examples of one or more embodiments. It is, of course, not possible to describe every conceivable combination of components or methodologies for purposes of describing the aforementioned embodiments, but one of ordinary skill in the art may recognize that many further combinations and permutations of various embodiments are possible. Accordingly, the described embodiments are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A method of operating a communications apparatus, comprising:
    maintaining, by the communications apparatus, a primary active signal set for a user equipment configured for communication with a wireless network; and
    maintaining, by the communications apparatus, a secondary active signal set for the user equipment by updating the secondary active signal set in response to one or more sectors being added to or deleted from the primary active signal set.

2. The method of claim 1, wherein the maintaining of the primary active signal set and/or the secondary active signal set is based upon uplink carrier signals that are generated in accordance with a high speed uplink packet access protocol.

3. The method of claim 1, wherein the secondary active signal set includes an enhanced dedicated channel (E-DCH).

4. The method of claim 3, wherein the secondary active signal set is maintained for cells on a secondary uplink carrier with a fractional dedicated physical channel (F-DPCH).

5. The method of claim 4, further comprising maintaining a secondary E-DCH active set for cells on the secondary uplink carrier with an enhanced hybrid ARQ indicator channel (E-HICH).

6. The method of claim 1, wherein the secondary active signal set corresponds to a subset of one or more sectors in the primary active signal set.

7. The method of claim 6, further comprising maintaining a secondary enhanced dedicated channel (E-DCH) active set based on the secondary active signal set.

8. The method of claim 7, wherein the secondary E-DCH active set corresponds to a subset of one or more sectors in a primary E-DCH active set.

9. The method of claim 1, wherein the maintaining of the primary active signal set and/or the secondary active signal set is based on one or more mobility events on an anchor carrier and/or a secondary carrier.

10. The method of claim 9, wherein the secondary active signal set is updated by adding or deleting the one or more sectors from the secondary active signal set or a secondary enhanced dedicated channel (E-DCH) active set in response to the one or more sectors being added to or deleted from the primary active signal set or a primary active E-DCH set.

11. The method of claim 1, further comprising determining a power control bit for a secondary uplink carrier and applying the power control bit to all cells in the secondary active signal set.

12. The method of claim 1, further comprising employing an Event 2a to change an anchor carrier.

13. The method of claim 1, further comprising generating a smooth handover between carriers.

14. The method of claim 13, further comprising processing one or more power control bits based on a received energy of pilot chip versus noise and total interference parameter (Ecp/Nt).

15. A communications apparatus, comprising:
    a memory that retains instructions for maintaining a primary active signal set for a user equipment configured for communication with a wireless network and maintaining a secondary active signal set for the user equipment by updating the secondary active signal set in response to one or more sectors being added to or deleted from the primary active signal set; and
    a processor that executes the instructions.

16. The communications apparatus of claim 15, wherein the secondary active signal set include an enhanced dedicated channel (E-DCH).

17. The communications apparatus of claim 16, wherein the secondary active signal set is maintained for cells on a secondary uplink carrier with a fractional dedicated physical channel (F-DPCH).

18. The communications apparatus of claim 17, further comprising instructions for maintaining a secondary E-DCH active set for cells on the secondary uplink carrier with an enhanced hybrid ARQ indicator channel (E-HICH).

19. The communications apparatus of claim 15, further comprising instructions for wherein the secondary active signal set corresponds to a subset of one or more sectors in the primary active signal set.

20. The communications apparatus of claim 19, further comprising instructions for maintaining a secondary enhanced dedicated channel (E-DCH) active set based on the secondary active signal set.

21. The communications apparatus of claim 20, wherein the secondary E-DCH active set corresponds to a subset of one or more sectors in a primary E-DCH active set.

22. The communications apparatus of claim 15, wherein the maintaining of the primary active signal set and/or the secondary active signal set is based on one or more mobility events on an anchor carrier and/or a secondary carrier.

23. The communications apparatus of claim 22, wherein the instructions update the secondary active signal set by adding or deleting the one or more sectors from the secondary active signal set or a secondary enhanced dedicated channel (E-DCH) active set in response to the one or more sectors being added to or deleted from the primary active signal set or a primary active E-DCH set.

24. A communications apparatus, comprising:
    means for maintaining a primary active signal set for a user equipment configured for communication with a wireless network; and means for maintaining a secondary active signal set for the user equipment by updating the secondary active signal set in response to one or more sectors being added to or deleted from the primary active signal set.

25. The communications apparatus of claim 24, wherein the secondary active signal set includes an enhanced dedicated channel (E-DCH).

26. A non-transitory computer-readable medium that includes code for multicarrier operations, the code comprising:
   code for causing a computer to maintain a primary active signal set for a user equipment configured for communication with a wireless network; and
   code for causing the computer to maintain a secondary active signal set for the user equipment by updating the secondary active signal set in response to one or more sectors being added to or deleted from the primary active signal set.

27. The non-transitory computer-readable medium of claim 26, wherein the secondary active signal sets include an enhanced dedicated channel (E-DCH).

28. A method of operating a communications apparatus, comprising:
   processing, by the communications apparatus, a primary active signal set for a user equipment configured for communication with a wireless network; and
   processing, by the communications apparatus, a secondary active signal set by updating the secondary active signal set in response to one or more sectors being added to or deleted from the primary active signal set.

29. The method of claim 28, wherein the secondary active signal set includes an enhanced dedicated channel (E-DCH).

30. The method of claim 29, wherein the secondary active signal set is processed for cells on a secondary uplink carrier with a fractional dedicated physical channel (F-DPCH).

31. The method of claim 30, further comprising processing a secondary E-DCH active set for cells on the secondary uplink carrier with an enhanced hybrid ARQ indicator channel (E-HICH).

32. The method of claim 28, wherein the secondary active signal set corresponds to a subset of one or more sectors in the primary active signal set.

33. The method of claim 28, further comprising processing one or more mobility events that are anchor-based events.

34. The method of claim 33, wherein the secondary active signal set is updated by adding or deleting the one or more sectors to or from the secondary active signal set or a secondary enhanced dedicated channel (E-DCH) active set in response to the one or more sectors being added to or deleted from the primary active signal set or a primary active E-DCH set.

35. The method of claim 34, further comprising processing a smooth handover between carriers.

36. A communications apparatus, comprising:
   a memory that retains instructions for processing a primary active signal set for a user equipment configured for communication with a wireless network, and processing a secondary active signal set by updating the secondary active signal set in response to one or more sectors being added to or deleted from the primary active signal set; and
   a processor that executes the instructions.

37. The communications apparatus of claim 36, the secondary active signal set includes an enhanced dedicated channel (E-DCH).

38. The communications apparatus of claim 37, wherein the secondary active signal set is processed for cells on a secondary uplink carrier with a fractional dedicated physical channel (F-DPCH).

39. The communications apparatus of claim 38, further comprising instructions for processing a secondary E-DCH active set for cells on the secondary uplink carrier with an enhanced hybrid ARQ indicator channel (E-HICH).

40. A communications apparatus, comprising:
   means for processing a primary active signal set for a user equipment configured for communication with a wireless network; and
   means for processing a secondary active signal set by updating the secondary active signal set in response to one or more sectors being added to or deleted from the primary active signal set.

41. The communications apparatus of claim 40, the secondary active signal set includes an enhanced dedicated channel (E-DCH).

42. A non-transitory computer-readable medium that includes code for multicarrier operations, the code comprising:
   code for causing a computer to process a primary active signal set for a user equipment configured for communication with a wireless network; and
   code for causing a computer to process a secondary active signal set by updating the secondary active signal set in response to one or more sectors being added to or deleted from the primary active signal set.

43. The non-transitory computer-readable medium of claim 42, wherein the secondary active signal sets include an enhanced dedicated channel (E-DCH).

44. The method of claim 1, wherein the primary active signal set includes sectors operating on an anchor carrier and the secondary active signal set includes sectors operating on a non-anchor carrier.

45. The method of claim 44, wherein maintaining the secondary active signal set includes:
   adding or deleting one or more additional sectors to or from the secondary active signal set in response to a mobility event that occurs on the non-anchor carrier,
   wherein the adding or deleting of the one or more additional sectors does not trigger the one or more additional sectors to be added to or deleted from the primary active signal set.

46. A method of operating a communications apparatus, comprising:
   maintaining, by the communications apparatus for a user equipment configured for communication with a wireless network, a primary active signal set that includes sectors operating on an anchor carrier based on one or more intra-carrier mobility events and one or more inter-carrier events that occur on the anchor carrier; and
   maintaining, by the communications apparatus for the user equipment, a secondary active signal set that includes sectors operating on a non-anchor carrier based on (i) the one or more inter-carrier mobility events that occur on the anchor carrier, and (ii) one or more intra-carrier mobility events that occur on the non-anchor carrier.

47. The method of claim 46, wherein the one or more inter-carrier events that occur on the anchor carrier include one or more Event 2 events.

48. The method of claim 47, wherein the one or more Event 2 events include one or more Event 2a events and/or one or more Event 2b events.

49. The method of claim 46, wherein the one or more intra-carrier events that occur on the anchor carrier and/or the non-anchor carrier include one or more Event 1 events.

50. The method of claim 49, wherein the one or more Event 1 events include one or more Event 1*a* events event and/or one or more Event 1*b* events.

\* \* \* \* \*